United States Patent [19]

Beasley et al.

[11] Patent Number: 4,742,497
[45] Date of Patent: May 3, 1988

[54] METHOD OF PROCESSING SEISMIC DATA

[75] Inventors: Craig Beasley; Ron Chambers, both of Houston, Tex.; Helmut Jakubowicz, Englefield Green, England

[73] Assignee: Western Atlas International, Inc., Houston, Tex.

[21] Appl. No.: 799,176

[22] Filed: Nov. 18, 1985

[51] Int. Cl.$^4$ .............................................. G01V 1/04
[52] U.S. Cl. ......................................... 367/52; 367/50
[58] Field of Search .................. 364/421, 422; 367/36, 367/37, 38, 39, 40, 41, 42, 43, 45, 47, 52, 53, 59, 62, 63, 68, 72, 50

[56] References Cited

U.S. PATENT DOCUMENTS

| | | | |
|---|---|---|---|
| 2,732,906 | 1/1956 | Mayne | 181/0.5 |
| 3,217,828 | 11/1965 | Mendenhall | 181/0.5 |
| 4,241,429 | 12/1980 | Bloomquist et al. | 367/52 |
| 4,330,873 | 5/1982 | Peterson | 367/60 |
| 4,403,312 | 9/1983 | Thomason | 367/56 |

OTHER PUBLICATIONS

Beasley et al. Prestack Partial Migration: A Comprehensive Solution to Problem in the Processing of 3-D Data, Western Geophysical 1984, pp. 1-6.
Apparent Velocity from Dipping Interface Reflections, F. K. Levin, *Geophysics* 1971, pp. 510-516.
Dip-Moveout by Fourier Thansform, Ira D. Hale, Doctoral Thesis, 1983, pp. 67-71.

*Primary Examiner*—Deborah L. Kyle
*Assistant Examiner*—Brian S. Steinberger
*Attorney, Agent, or Firm*—William A. Knox; Barry C. Kane

[57] ABSTRACT

A computationally-economical method for converting a set of areally-distributed seismic traces into a new, clearly-resolved, three-dimensional display of a volume of the earth without use of dip-dependent or azimuth-dependent migration velocities.

3 Claims, 2 Drawing Sheets

METHOD OF PROCESSING SEISMIC DATA

BACKGROUND OF THE INVENTION

1. Field of the Invention

This invention is concerned with an improved method for transforming a set of spatially-distributed non-zero-offset seismic traces into a new set of dip-resolved, zero-offset, unmigrated output seismic traces representative of the three-dimensional configuration of a volume of the earth.

2. Discussion of the Prior Art

Common Mid Point (CMP) stacking, (also sometimes referred to as Common Depth Point or Common Reflection Point, CDP or CRP respectively) of seismic field data is well known. See for example U.S. Pat. Nos. 3,217,828 to Mendenhall et al, and 2,732,906 to Mayne, which are incorporated herein by reference as a teaching of the CMP technique. The U.S. Pat. No. 3,217,828 teaches two-dimensional (2-D) data processing where dipping earth layers are projected into a two-dimensional plane, perpendicular to the surface of the earth, along a designated line of profile.

The earth is three dimensional. It is the configuration of a volume of earth that is of interest for mapping three-dimensional (3-D) structures likely to contain valuable mineral resources. In 2-D processing, only the dip component parallel to the line of survey is mapped. Earth-layer dip components lying outside the 2-D plane are distorted.

The limitations of conventional 2-D calculations are three-fold:

First, for a dipping reflector, the true reflecting point for a reflection at a non-zero offset lies up-dip from the midpoint between a seismic source and a receiver of seismic signals. When the data from different offsets are stacked, reflection-point smear occurs.

Second, stacking velocities are dip-dependent and hence when events with differing dips cross on a processed seismic section, no single velocity function will properly align the different events on the CMP gather at that location. That situation causes conventional stacking to mis-stack the events for which the chosen velocity was inappropriate.

Third, the stacking velocities are azimuth-dependent. That is, the stacking velocity depends on the orientation of the direction of maximum dip with respect to the vertical plane between the seismic source and the receiver.

Because 2-D exploration is confined to single lines of profile, 3-D resolution of the details of a volume of the earth based upon 2-D data is often somewhat distorted.

3-D areal coverage often takes the form of a grid of seismic lines consisting essentially of two sets of lines orthogonally arranged with respect to one another. Each line includes a plurality of seismic-signal receivers interspersed with a plurality of seismic sources that are emplaced at desired locations within the grid. The grid may, however, be rectangular, circular, hexagonal, star-shaped or any other desired geometrical pattern. The grid of sources and receivers is customarily emplaced horizontally over the surface of the earth but conceptually at least, there is no reason why vertical arrays should be excluded. With suitable equipment adaptations, 3-D operations may be carried out on land or at sea.

Within a reasonable radius of about two miles or so, the firing of any one source will insonify an entire array of seismic sensors or receivers in a large area. Accordingly, any source-receiver pair, or combination thereof, along any desired azimuth therebetween, may be designated as a "line of profile."

The area of survey may be divided into cells of suitable geometrical shape such as a rectangle. The cell dimensions depend upon the ultimate resolution desired but dimensions such as 25 by 50 meters or less are not uncommon. In processing, for any given source-receiver pair, there may be designated a midpoint; the midpoint is assigned to an appropriate cell for mapping and other purposes.

U.S. Pat. Nos. 4,241,429; 4,330,873; and 4,403,312 are typical of prior-art 3-D seismic exploration arrays. F. K. Levin in "Apparent Velocity from Dipping Interface Reflections," Geophysics, 1971, pp 510–516, discusses the dependence of the medium velocity on dip and azimuth.

Ordinarily, the geophysicist has no prior knowledge of local dip or azimuth of a line of profile with respect to the direction of maximum dip. There is therefore always the problem of selection of the proper migration velocity function for dip migration. Yet that problem is of key interest when steep dips, substantially greater than about 10 degrees, are present. As Levin pointed out, and as will be discussed later, if the migration velocity is not corrected for both dip and azimuth when reflection-point data derived from different offsets and azimuths are stacked, the data are smeared.

The most direct method of overcoming reflection-point smear is to perform migration before stack. That technique converts non-zero offset data directly to the final migrated image without any restriction on dip, offset or azimuth. Full migration before stack is however, a very costly process computationally because, for a 3-D survey, as many as 2 to 10 million traces, each including 1500 to 2000 samples, must be individually processed. Furthermore, the migration velocity field must be known with considerable accuracy before pre-stack migration is possible. That requirement involves additional expensive velocity analyses. It is evident therefore, that the data-compression capability offered by stacking before migration, is highly desirable.

An attractive alternative to full migration before stack in 2-D is the use of Pre-stack Partial Migration, also known as Dip Moveout Correction (DMO). That process attempts the relatively modest task of converting finite-offset data that have had a conventional normal moveout correction (NMO) applied using migration velocities, to true zero offset. DMO removes the effect of reflection-point smear and enables events to be stacked coherently regardless of dip or azimuth. Thereafter the data can be stacked and migrated conventionally but with a substantial degree of data compression. An additional advantage is that DMO is a relatively small correction that tends to be insensitive to errors in the estimated velocity used for NMO corrections.

Hale proposed a DMO algorithm for 2-D data reduction in his Doctoral thesis "Dip Moveout by Fourier Transform", submitted to the Department of Geophysics, Stanford University, May, 1983. On pages 67–71, he proposes to extend his 2-D analysis from 2-D to 3-D but fails to arrive at a computationally practical analytical solution.

A major disadvantage of the Hale transform in 3-D is that it cannot be directly reformulated as a Fourier transform. His method requires the equivalent computational effort of a discrete transform rather than a Fast Fourier Transform. In his process, the amount of computation is the same for all offsets (except zero offset) and for all travel times, whereas it is known that the DMO operator has little effect for small offsets and increasing travel times. The Hale transform cannot exploit that property.

An intractable problem in 3-D DMO processing is that the source-receiver offset is a vector rather than a scalar quantity as it is in 2-D. Furthermore, the data are smeared over an ellipsoidal surface instead of along a line. In a typical 3-D survey where the magnitudes of the offsets and azimuths may vary drastically, the number of separate offsets that must be processed using conventional approaches may approach the number of traces in the survey.

SUMMARY OF THE INVENTION

It is the purpose of this invention to provide an efficient and computationally-economical computer-aided implementation of a method for converting a set of areally-distributed seismic field traces into a new, clearly-resolved three-dimensional volume of seismic traces representative of the earth in the presence of dipping layers along offsets having varying azimuths.

In accordance with an aspect of this invention, a plurality of seismic traces are generated at a plurality of seismic signal receivers that are insonified by a plurality of seismic sources arranged in areal arrays in a region to be surveyed. A line is established between a selected source and a receiver, along which line there are defined a plurality of cells, $m_i$. The seismic trace derived from the selected receiver is normal-moveout corrected and weighted in inverse proportion to the offset between a midpoint $m_o$ and the respective cell $m_i$ and proportional to the square root of the seismic trace time to create a set of weighted traces. The traces are altered by applying a moveout coefficient. The altered traces are stacked into the corresponding cells $m_i$. The process is repeated for all source-receiver locations of interest. The stacked traces from all cells may be displayed as a zero-offset, unmigrated three-dimensional structural representation of a volume of the earth.

BRIEF DESCRIPTION OF THE DRAWINGS

The objects and methods of this invention will be better understood by reference to the drawings wherein.

DETAILED DESCRIPTION OF THE PREFERRED METHOD OF THIS INVENTION

It is presumed that one skilled in the art is sufficiently familiar with U.S. Pat. Nos. 3,217,828 and 2,732,906 and other references previously cited so that a detailed discussion of conventional CMP profiling is unnecessary here.

Figure 1:
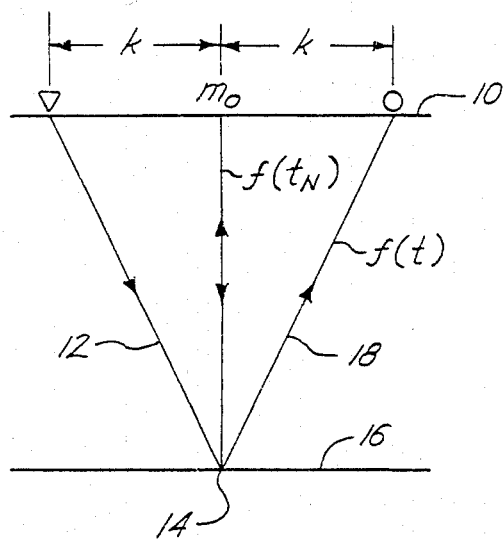
FIG. 1 defines the ray paths associated with an acoustic source and a receiver in the presence of a non-dipping earth layer.

Referring now to FIG. 1, we define certain quantities to be discussed later in detail. The next several paragraphs are tutorial in nature. A portion of the surface of the earth is shown at 10. A sound source S is offset from a receiver R by an offset distance 2 k with a midpoint at $m_o$. A wave field generated at S, travels along ray path 12 to a reflecting point 14 on reflector 16 and is reflected back along ray path 18 to receiver R. The amplitude of the wave field as a function of time, f(t), is recorded on a time-scale recording, hereinafter referred to as a trace. Seismic data are usually quantized as digital samples. In the processes next to be discussed, each sample of a seismic trace is operated upon individually. In the interest of brevity, use of the collective term "seismic trace" in conjunction with a process means that every data sample of that trace has been individually subjected to the named process.

Because of the offset distance 2 k, the arrival time t of a particular wavelet along path S-14-R is greater than the travel time $t_N$ of a wavelet that might have traveled along a direct path $m_o$-14-$m_o$. The time difference is termed normal moveout (NMO). The quantity f(t) is corrected for NMO by the relation $$t_N^2 = t^2 - (4k^2/V^2), \qquad (1)$$

where V is the root mean squared (RMS) velocity of the medium through which the wavelet traveled. The above relation is accurate for reflector dip components of about ten degrees or less. It should be observed that for trivial dips and zero offset the reflection points for $f(t_N)$ such as 14 lie along a semicircle centered at $m_o$. Wavelet amplitude varies according to the inverse square law due to geometric spreading.

Figure 2:
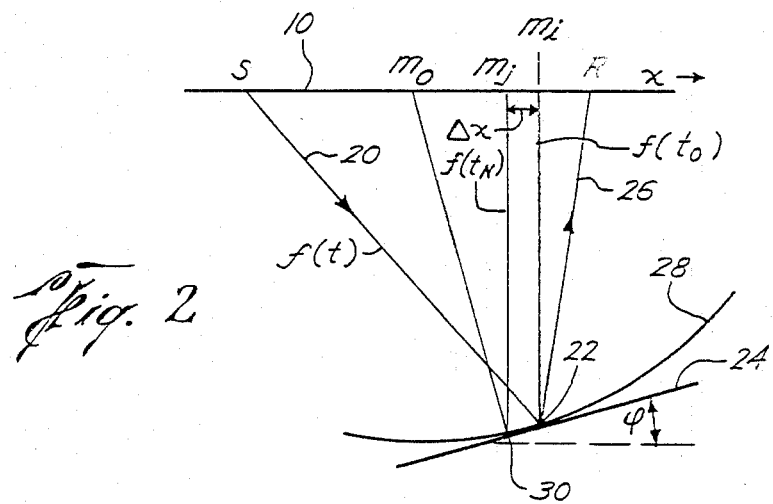
FIG. 2 shows the effects of reflection-point smear in the presence of a dipping earth layer.

In the presence of substantial dip, the simple formulation of equation (1) is no longer valid. Refer now to FIG. 2. A wavelet propagates from S along ray path 20 to reflecting point 22 on dipping reflector 24 and thence to R along path 26, R being offset from S by distance 2 k. The reflecting points for a finite offset no longer lie along a semicircle, as for zero-offset travel paths; they lie along an ellipse having foci at S and R. Thus, for the finite-offset ray path, the true reflecting point 22 lies up dip from the zero-offset reflecting point 30. The finite-offset travel time corrected for NMO results in $f(t_N)$ at point 30, projected along a perpendicular to $m_j$, which is actually the unmigrated depth point for a zero-offset travel path. The true migrated depth point $f(t_o)$ at 22 lies beneath $m_i$ which is separated from $m_j$ by the distance $\Delta x \sec \phi$. Accordingly, if one attempts to stack trace samples having the same midpoint but different offsets, the data are smeared. If one had prior knowledge of the local dip, one could apply NMO using a dip-dependent velocity but for reasons to be explained that adjustment is usually not possible and even if it were possible, it is correct only for that single dip.

Our introductory remarks pertained to two-dimensional geometry along a plane parallel to the direction of dip. Our concern however, is to image a three-dimensional volume of the earth.

Figure 3:
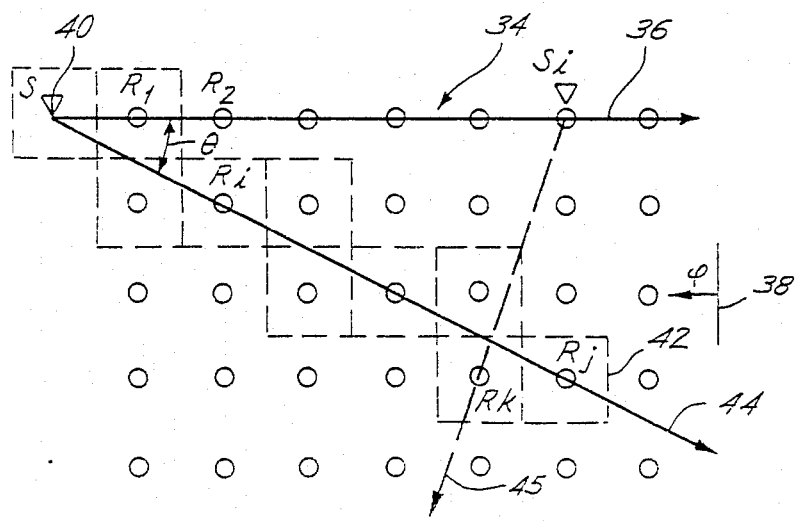
FIG. 3 illustrates an example of a source-receiver seismic array.

FIG. 3 is a plan view of an array 34 of receivers (represented by circles) arranged in a desired pattern at or near the surface of the earth. The array is applicable to many land or marine operations.

The direction of progress along a line of profile is assumed to be west to east such as along line 36, parallel to the direction of maximum dip as shown by the dip-strike symbol 38, having dip angle $\phi$. A source S, at the initial position shown by the inverted triangle 40, is fired to generate seismic time-scale traces for every receiver in the array within range of source S. The source is then moved to a new position such as receiver position R, where the source is again fired. The survey proceeds as the source is moved along line of profile 36, thence back and forth along each tier of receivers. Tie lines may be surveyed along the north-south direction as desired. Each time a source is fired, a new seismic trace is generated for each receiver of the array. The set of data received by each receiver may be assigned to a cell such as 42 associated with the receivers. For later data processing, the respective cells may correspond to suitable locations in a computer memory or disk storage wherein the seismic traces are stored in the form of digital samples.

Along any given line such as 36, a 2-D picture of a slice of the earth may be generated as described for FIG. 2. Incident ray points for non-zero offsets lie along an ellipse. For any line 44 lying at an arbitrary angle (azimuth) to the direction of maximum dip in a 3-D array, the incident ray points lie on the surface of an ellipsoid whose major axis is aligned along azimuth angle $\theta$. Scalar quantities in a 2-D projection become vectors in 3-D. Levin, previously cited, shows that the ratio between a dip-dependent velocity $V_D$ and the medium velocity V is $$V_D/V = (1 - \sin^2\phi \cos^2\theta)^{-\frac{1}{2}} \qquad (2)$$

For large dips and small azimuths, the ratio becomes very large. Thus for 3-D processing, the stacking velocity is both dip-dependent and azimuth-dependent. We usually do not know the value of the local dip and strike although we may have knowledge of the regional dip of the area taken as a whole. Therefore, we do not know the correct stacking velocity. It is the purpose of this invention to provide a data processing method that is independent of dip and azimuth and thus reduce dependency on an accurate knowledge of the velocity function.

Figure 4:
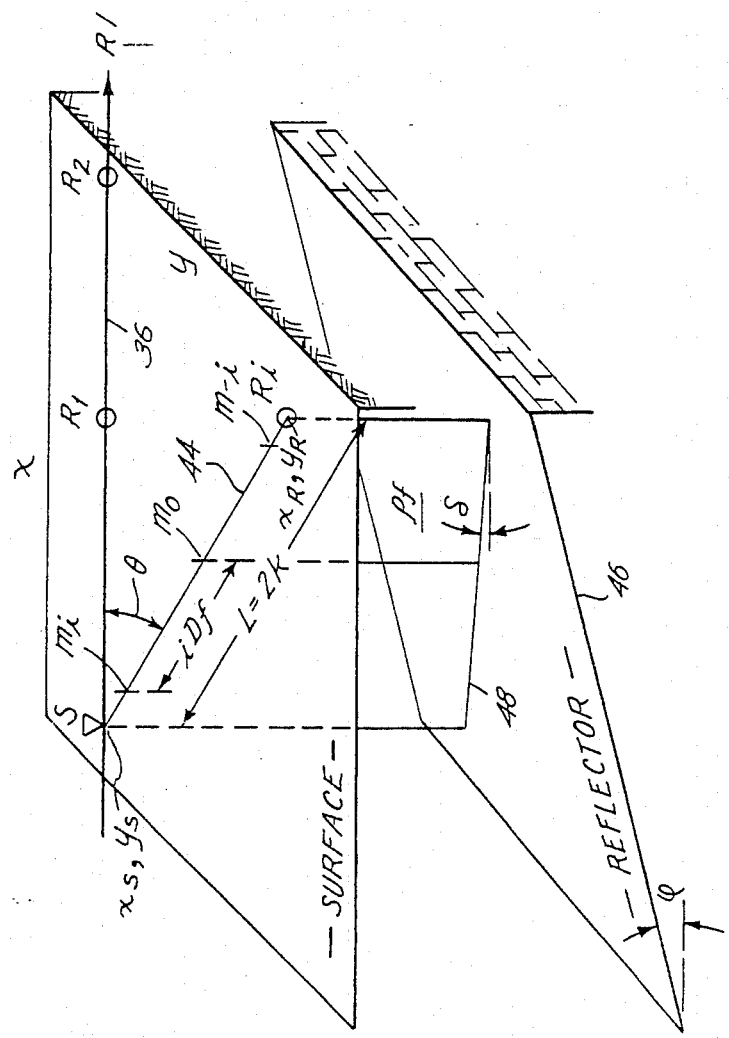
FIG. 4 is an isometric view of a volume of the earth to illustrate of the significance of various symbolic quantities.

Refer now to FIG. 4. There is shown the surface of the earth in x, y coordinates. FIG. 4 is an expanded isometric view of that portion of array 34 that includes S, $R_1$, $R_2$, and $R_i$. Line 44 makes an azimuth angle of $\theta$ with respect to the direction of maximum dip. A portion of a reflecting interface 46 is shown beneath the surface with a dip of $\phi$ as in FIGS. 2 and 3. Below line segment 48 projected vertically below line 44 reflector 46 has a dip component $\delta$.

Source S, having coordinates $(x_S, y_S)$ is offset from receiver $R_i$, having coordinates $(x_R, y_R)$, by a distance $L=2K$ and having a midpoint $m_o$. Source S generates a wave field f(t) that is reflected from dipping interface 46 and received by receiver $R_i$. We now define a plane Pf along line 44, perpendicular to the surface and having end coordinates $(x_S, y_S)$, $(x_R, y_R)$. We now choose a distance Df and define points $m_i$ on line 44 such that $$d(m_o, m_i) = d(m_o, m_{-i}) = iDF. \qquad (3)$$

A plurality of points $m_i$ may be generated such that the running index i lies within the limits n is less than or equal to i which is less than or equal to n, and nDf is less than or equal to k. The $m_i$ designate the centers of cells such as 42 of FIG. 3, or smaller subdivisions of such cells. The dimensions of the cells depend upon the resolution available from the 3-D array and that desired for the final 3-D display of data.

As a first step, we apply NMO to f(t) to find $f(t_N)$. For this step, the NMO correction is based upon the RMS medium velocity. Next, define a quantity $C_i$ for each $-n \leq i \leq n$ such that $$C_i = [1 - (iDf/K)^2]^{\frac{1}{2}}. \qquad (4)$$

Compute an amplitude weighting coefficient w, where $$w_i = C_i/kt_n^{\frac{1}{2}}. \qquad (5)$$

Next, weight $f(t_N)$ in proportion to $w_i$ for every $m_i$ to get $f_w(t_N)$. The weighting coefficient adjusts the amplitude of the seismic trace $f(t_N)$ in proportion to the square root of the travel time and in inverse proportion to the offset to compensate for the difference in geometric spreading of a wavelet at an $m_i$ relative to $m_o$.

We alter the weighted traces $f_w(t_n)$ at the respective $m_i$ by applying a moveout coefficient $C_i$ which is a function of the ratio between $m_o$ and the respective $m_i$, and the half-offset k, according to $$t_o = C_i T_n \qquad (6)$$

and stack the result in the seismic traces contained in the cells centered at each of the $m_i$ in the plane Pf. The stacked (summed) quantity corresponds to a zero-offset experiment in three-dimensional space.

The characteristics of the moveout coefficient $C_i$ are of interest. When iDf is zero, that is when $m_i = m_o$, $C_i$ is unity and $f(t_o) = f(t_N)$, the NMO-corrected two-way travel time from $m_o$, migrated to $m_j$. When iDf approaches k, $C \rightarrow 0$ and $f(t_o)$ approaches 0. That result is of course implausible. Accordingly as iDf approaches k, the end times of the reflection incident-point ellipse are modified such that the time gradient is limited in proportion to $$dt/dx < 2 \sin\psi/V(t_N),$$

where $\psi$ is the maximum geologic dip that may be assumed to exist in the survey area, and x is the distance between adjacent $m_i$.

For purposes of explanation, the example of FIG. 4 was confined to a line segment 44 extending from S to $R_i$. But the processing is not to be confined to that short line segment; it may be extended from S to $R_j$ and beyond as shown in FIG. 3.

Other source-receiver pairs may be chosen such as from a source $S_i$ through a receiver $R_k$ along the dashed line 45 in FIG. 3. Some of the cells $m_i$ along $S_i-R_k$ would be coincident with other cells $m_j$ along line $S-R_j$. Seismic traces common to any one cell, regardless of the source-receiver locations would be stacked together because they represent the same subsurface reflection point. In an actual field survey, there may be as many source locations as there are receiver locations. The process outlined above is carried out for every source-receiver combination of interest in the area of survey. Usually the final stacked values in the respective cells are normalized to compensate for the variable number of traces summed.

The stacked seismic traces in each cell can be displayed either as a three-dimensional volume of the earth in the form of, for example, an isometric cube, or the data may be displayed as sets of two-dimensional panels at the option of the user, using conventional processing techniques.

Advantageously, the procedure avoids the use of dip-dependent and azimuth-dependent velocities. The only velocity involved is a best estimate of the RMS medium velocity used to compute the NMO.

Figure 5:
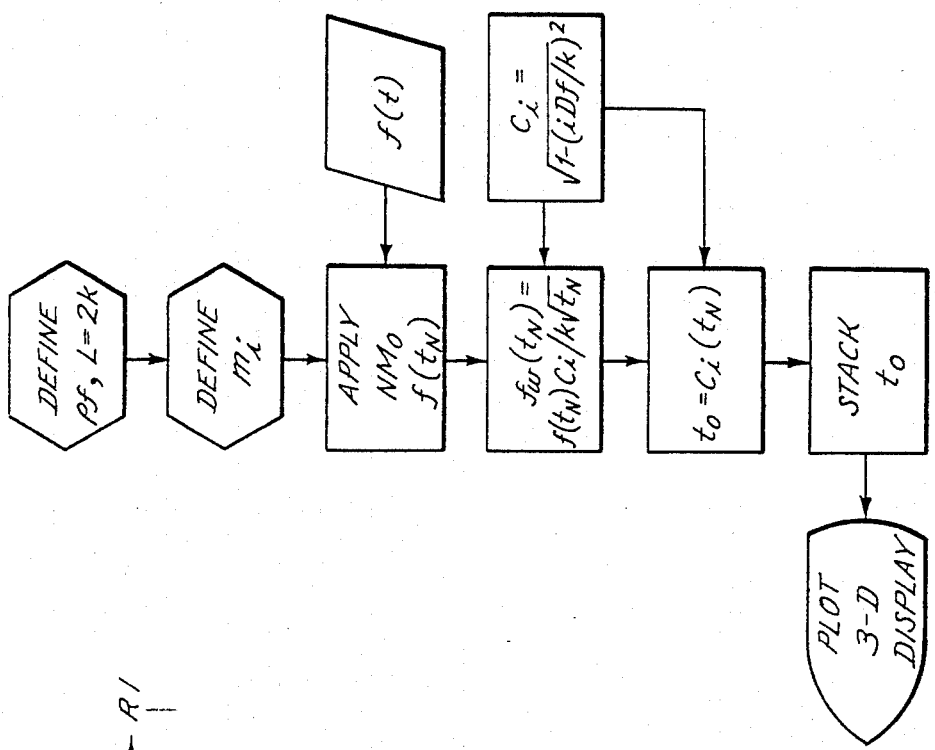
FIG. 5 is a flow diagram of a computer implementation of the process of this invention.

Because of the massive number of calculations needed, the process is preferably computer implemented in accordance with the flow diagram of FIG. 5.

This invention has been written with a certain degree of specificity by way of example only. Other procedures and techniques may occur to those skilled in the art but which remain within the scope of this disclosure which is limited only by the appended claims.

We claim as our invention:

1. A method for producing three-dimensional seismic sections, comprising the steps of:
   (a) generating a plurality of seismic traces at a plurality of corresponding seismic-signal receiver locations by means of seismic-wave-field generators positioned at a plurality of source locations within an area of survey;
   (b) defining a plurality of cells within said area of interest to form a grid along the surface of the earth, each of said plurality of cells having predetermined dimension;
   (c) arbitrarily selecting a source location, and a receiver location where a seismic trace is generated, the source location and receiver location being separated by a predetermined offset distance;
   (d) defining a line between the source location and receiver location, the line intersecting a plurality of the cells along a midpoint of each cell, and having an unknown azimuth with respect to a direction of geologic dip within the area of survey;
   (e) correcting each seismic trace for normal-movement, the correction for normal-moveout derived from the offset distance and a predetermined root-mean-squared velocity;
   (f) amplitude weighting each normal-moveout corrected trace for each of said plurality of cells to compensate for geometric spreading between the source and receiver locations;
   (g) altering the amplitude-weighted trace for each of said plurality of cells by applying a moveout coefficient, the moveout coefficient being a function of the distance from a predetermined cell to the midpoint between the source location and receiver location and half the offset distance;
   (h) stacking the respective altered seismic traces into cells corresponding with the receiver location;
   (i) repeating steps (a) through (h) for preselect combinations of source-receiver locations of interest within the survey area; and
   (j) displaying the altered stacked seismic traces as a three-dimensional representation of a volume of the earth.

2. A method for stacking three dimensional seismic data to form a seismic section, the data consisting of a plurality of traces corresponding to individual source-to-receiver pairs stacked into a plurality of cells geometrically defined on a representation of the surface of the earth and in which stacking is based upon a selected root-mean-squared velocity, comprising the steps of:
   (a) normal-moveout correcting each trace prior to stacking based on the source-to-receiver distance for each trace;
   (b) weighting each normal-moveout corrected trace to compensate for geometric spreading between the source-to-receiver pairs according to the expression:

$$f_w(t_N) = f(t_n)C_i/kt_n^{\frac{1}{2}};$$

where
   $f_w(t_N)$ is a weighted function of signal travel time;
   $f(t_n)$ is a function of travel time;
   $c_i$ is a moveout coefficient; and
   K is one-half the offset distance;
   (c) altering the resultant normal-moveout corrected and weighted traces by a moveout coefficient which is a function of a relative distance between the cell into which each trace is to be stacked and the midpoint between the source and receiver corresponding to that trace, the altering of the traces made according to the expressions:

$$t_o = C_i t_N;$$

$$C_i = [1 - (iDf/K)^2]^{\frac{1}{2}};$$

where
   $t_o$ is the altered travel time seismic signal; and
   iDf is one-half the dimension of the cell.

3. The method as defined by claim 2, further including the step of defining a time gradient between adjacent cells in proportion to a maximum expected geologic dip.

* * * * *